J. H. VAN DEVENTER.
COUNTERBALANCED BEARING.
APPLICATION FILED APR. 22, 1912.

1,070,088.

Patented Aug. 12, 1913.

WITNESSES:

INVENTOR
John Herbert Van Deventer
BY
ATTORNEY

UNITED STATES PATENT OFFICE.

JOHN HERBERT VAN DEVENTER, OF BUFFALO, NEW YORK, ASSIGNOR TO BUFFALO FORGE COMPANY, OF BUFFALO, NEW YORK, A CORPORATION OF NEW YORK.

COUNTERBALANCED BEARING.

1,070,088.  Specification of Letters Patent.  Patented Aug. 12, 1913.

Application filed April 22, 1912. Serial No. 692,313.

*To all whom it may concern:*

Be it known that I, JOHN HERBERT VAN DEVENTER, a citizen of the United States of America, residing at Buffalo, in the county of Erie and State of New York, have invented certain new and useful Improvements in Counterbalanced Bearings, of which the following is a full, clear, and exact description.

My invention relates to bearings for rotary engines and more particularly to the bearings of double opposed or twin rotary engines.

As is well known, in engines of the rotary type, the impactive and expansive force of the motive fluid supplied to the engine is brought to bear at one side of the rotors. This produces an excessive lateral thrust on the rotors and causes the bearings which carry the same to wear unevenly.

The general object of my invention has been: to provide a bearing which shall utilize the pressure of the fluid supplied to the engine to counter-balance the lateral thrust caused by the fluid entering the rotors of the engine.

In the specification and the appended claims, the term "fluid" will be used as a general term for the pressure medium, but the engine is especially adapted to be driven by steam, and obviously, it is applicable to be propelled by either steam or compressed air, as well as any fluid under pressure.

Figure 1:
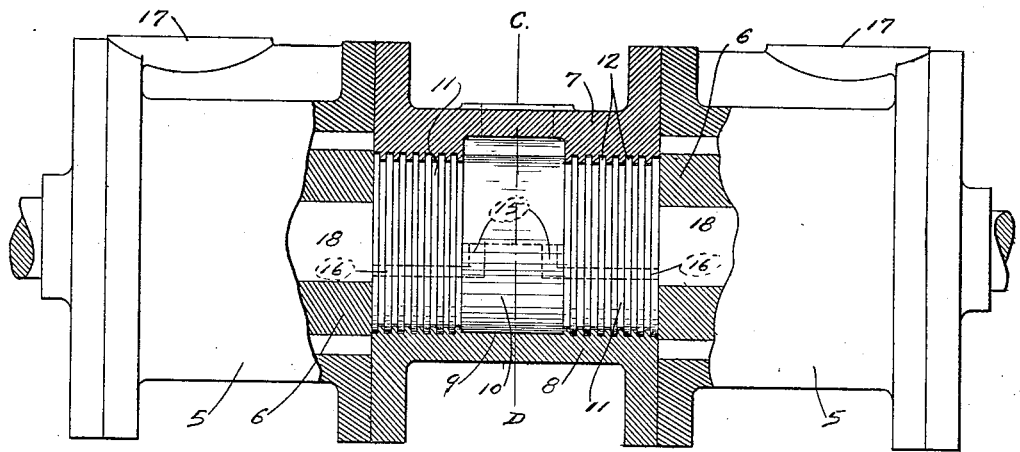
Figure 2:
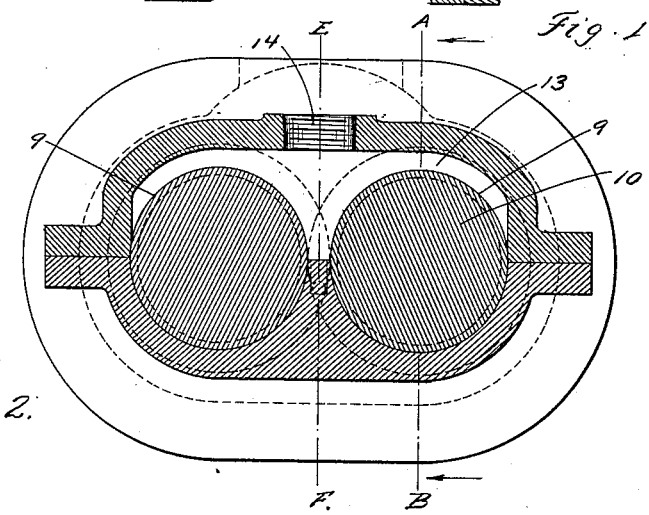
Figure 3:
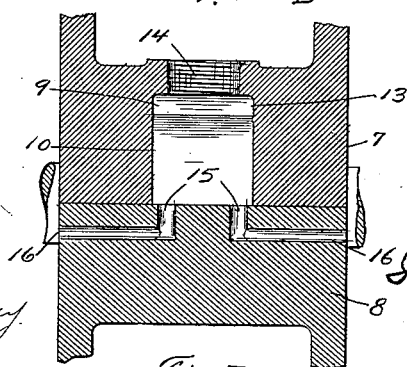

Reference is to be had to the accompanying drawings forming part of this specification, in which like characters of reference indicate like parts throughout the several views of which:

Figure 1 is a fragmental, sectional side elevation of my bearing and is taken on line A—B of Fig. 2. Fig. 2 is a sectional elevation of my invention taken on line C—D of Fig. 1. Fig. 3 is a fragmental section of my invention and is taken on line E—F of Fig. 2.

In the drawings, I have shown my bearing as adapted to a double opposed or twin rotary engine.

5 represents the casings of the rotary engines, which are provided with suitable exhaust ports 17, and 6 are the rotors of the same. Disposed between the casings 5 is the central bearing casing of my device, which comprises an upper part 7 and a lower part 8. These parts are secured together by any suitable means. Carried in this casing are the counter-balance bearings, each of which comprises an enlarged journal 9, which is preferably an integral part of the rotor shafts 18. Each of these journals is provided with a central smooth portion 10 and at each end with a collar portion 11. These collar portions are formed with a plurality of annular collars 12, which are spaced preferably equidistant and extend from the smooth portion 10 to the end of the central bearing casing. These annular collars are disposed in an equal number of annular grooves provided in the upper and lower parts of the bearing casing and are so arranged that they bear only on their faces, thus providing thrust bearings for the rotors of the engines, as well as means for preventing the fluid from passing along the journal.

A fluid chamber 13 is provided in the upper part of the central bearing casing and is so arranged longitudinally as to register with the smooth portion 10 of the journal 9. This recess extends across the upper part of each of the journals 9 and exposes them for substantially one-half their circumferences. An inlet port 14 is also provided in the upper part 7 of the bearing casing and opens into the fluid chamber 13, whereby fluid under pressure may be conducted to said chamber.

Provided in the lower part 8 of the central bearing casing are two lateral vertically disposed apertures 15, each of which communicates with a longitudinal aperture 16. The apertures 15 open into the fluid chamber 13 so that the fluid under pressure is communicated by means of the apertures 15 and 16 to the rotors of the engine, and thus provide the inlet ports for the same.

When the engine to which my bearing is attached is connected up to a source of motive fluid, it will be seen, that the pressure of the fluid will be brought to bear upon the upper unexposed parts of the smooth portions 10 of the journals, and exert a pressure upon them which will vary according to the projected area of their unexposed portions and the pressure of the fluid supplied to the engine. These unexposed portions of the journals, being above the center line of the rotors and the inlet ports being below the center line, the fluid under pressure will bear upon these unexposed portions and act to counter-balance the impactive and expansive force of the motive fluid as it enters the rotors of the engine.

Obviously, some modifications of my invention, as herein shown and described may be made without departing from the spirit of my invention or the scope of the appended claims, and I do not wish to be limited to the exact embodiment herein shown and described.

Having thus described my invention, what I claim is:

1. In a rotary engine, a counter-balanced bearing, comprising a casing, enlarged journals rotatably mounted in said casing, a fluid chamber provided in said casing and exposing a portion of said journals, said casing being formed with rotor inlet ports communicating with said fluid chamber, whereby fluid under pressure may be admitted to said fluid chamber and thence to the engine rotors and the lateral thrust in said journals be counter-balanced.

2. In a rotary engine, a counter-balanced bearing, comprising a casing, composed of an upper and lower part, enlarged journals rotatably mounted in said casing and a fluid chamber provided in the upper part of said casing and exposing a portion of said journals, the lower part of said casing being formed with ports communicating with said fluid chamber, whereby fluid under pressure may be admitted to said fluid chamber and to the engine rotors and lateral thrust in said journals be counter-balanced.

3. In a rotary engine, a counter-balanced bearing, comprising a casing, composed of an upper and lower part, enlarged journals rotatably mounted in said casing, a fluid chamber provided in the upper part of said casing and exposing a portion of said journals, the lower part of said casing being formed with ports communicating with said fluid chamber, and means at either end of each of said journals for preventing fluid from leaking between said journals and said bearing, whereby fluid under pressure may be admitted to said fluid chamber and to the engine rotors and lateral thrust in said journals be counter-balanced.

4. In a rotary engine, a counter-balanced bearing, comprising a casing, composed of an upper and lower part, enlarged journals rotatably mounted in said casing, each of said journals being provided with a central smooth portion and a collar portion at each end of said smooth portion, and a fluid chamber provided in the upper part of said casing and exposing a portion of said journals, the lower part of said casing being formed with ports communicating with said fluid chamber, whereby fluid under pressure may be admitted to said fluid chamber and to the engine rotors and lateral thrust in said journals be counter-balanced.

5. In a rotary engine, a counter-balanced bearing, comprising a casing, composed of an upper and lower part, enlarged journals rotatably mounted in said casing and integral with the shafts of the rotors of said engine, and a fluid chamber provided in the upper part of said casing and exposing a portion of said journals, the lower part of said casing being formed with ports communicating with said fluid chamber, whereby fluid under pressure may be admitted to said fluid chamber and to the engine rotors and lateral thrust in said journals be counter-balanced.

In testimony whereof, I have hereunto signed my name in the presence of two subscribing witnesses.

JOHN HERBERT VAN DEVENTER.

Witnesses:
J. WM. ELLIS,
WALTER H. KELLEY.

Copies of this patent may be obtained for five cents each, by addressing the "Commissioner of Patents, Washington, D. C."